United States Patent [19]

Powers et al.

[11] 3,946,785

[45] Mar. 30, 1976

[54] SIMPLIFIED BEAD CONSTRUCTION FOR PNEUMATIC TIRES

[75] Inventors: Robert Pope Powers; James Dennis Gardner, both of Akron, Ohio

[73] Assignee: The Firestone Tire & Rubber Company, Akron, Ohio

[22] Filed: Aug. 1, 1974

[21] Appl. No.: 494,018

[52] U.S. Cl.............................. 152/354; 152/362 R
[51] Int. Cl.²......................................... B60C 15/00
[58] Field of Search... 152/362 R, 354, 357, 362 CS

[56] References Cited
UNITED STATES PATENTS

| | | | |
|---|---|---|---|
| 1,393,952 | 10/1921 | Miller............................ | 152/362 R |
| 2,966,933 | 1/1961 | Boussu et al.................... | 152/362 R |
| 3,062,259 | 11/1962 | Boussu et al....................... | 152/356 |
| 3,386,486 | 6/1968 | Kovac et al........................ | 152/354 |

FOREIGN PATENTS OR APPLICATIONS

| | | | |
|---|---|---|---|
| 995,645 | 6/1965 | United Kingdom............. | 152/362 R |
| 990,524 | 4/1965 | United Kingdom | |

*Primary Examiner*—Drayton E. Hoffman
*Assistant Examiner*—Francis J. Bartuska

[57] ABSTRACT

This disclosure relates to a radial ply pneumatic tire having one or more body plies containing radially directed inextensible reinforcing cords with the ply ends of such cords terminating on the same side of the bead bundle as the ply; that is, the ply ends are neither turned up or turned down around the bead bundle. The tire further has a bead connector ply containing radial, inextensible reinforcing cords, which is wrapped around the bead bundle. The inextensible radial cords of the bead connector ply and the radial cords of the body ply give the effect of one ply which is wrapped around the bead bundle. These plies may be considered to nest together to form a strong tire construction.

10 Claims, 5 Drawing Figures

SIMPLIFIED BEAD CONSTRUCTION FOR PNEUMATIC TIRES

BACKGROUND OF THE INVENTION AND PRIOR ART

This invention relates to radial ply pneumatic tires which are used on passenger, truck, off-the-road, tractor and industrial vehicles, but particularly to truck tires. It specifically relates to such tires in which the reinforcing cords in the body plies are radially directed and consist of an inextensible material, such as glass, steel wire and Kevlar. The normal, commercial tire employing this type of construction, whether it be truck or passenger, has the end of the reinforcing body ply wrapped around the bead bundle either by turning the ply end up or down around the bead bundle. In the usual construction, the tire may also have a bead wrap around the bead bundle. The cords in the bead wrap usually form an angle to the radial plane of the tire.

In the prior art constructions of this type of tire, the manufacturing costs and problems have been extreme. Due to the inherent stiffness in the inextensible reinforcing cords of the body ply, it is difficult and costly to wrap the ply ends around the bead bundle. It is also difficult and costly to wrap the bead wrap around the bead bundle when it contains stiff, inextensible cords that form an angle to the radial direction of the tire. These problems often result in a tire failure in the bead area due to a separation at either the turned up edge of the body reinforcing ply or at the edges of the bead wrap.

The prior art constructions contain a bead reinforce ply having inextensible cords at a bias to the radial plane of the tire to strengthen and stiffen the tire bead area. The presence of this ply causes construction problems and resulting failures by separation at the edges of these reinforce plies. In this invention these bias reinforce plies may be eliminated.

The present invention departs from the prior art in several aspects, one of which is the elimination of the necessity to wrap the end of the reinforcing body ply around the bead bundle. The concept of no turn ups of the ends of the body ply has been taught, see, for example, U.S. Pat. Nos. 1,219,420; 1,393,952; 3,062,259 and 3,386,486; French Pat. Nos. 1,124,766 and 1,127,521 and British Pat. No. 990,524.

The patents listed above disclose (1) the elimination of wrapping the ends of body fabrics around the bead bundle, (2) the cord angle of such body plies may be radial or biased, (3) the cords in the body plies may be an inextensible or extensible material, (4) the cords of the bead wrap may be an extensible or inextensible material that are parallel to or form angles to the radial direction of the tire, and (5) the body ply may be sandwiched between the ends of the bead wrap.

Some of the prior art referred to above, specifically British Pat. No. 990,524, discloses a radial ply body and a radial ply bead wrap. However, in this type of prior art the body ply is made of an extensible cord, rayon, and the bead wrap is made of an inextensible cord, steel. The inherent differences in the properties of the cords in these two plies, specifically modulus, result in the cords not acting together as if they were one ply, as does the present invention.

Also, in the prior art the body ply ends are sandwiched between the ends of the bead wrap. This means that the bead wrap may not be assembled onto the bead bundle prior to the application of the bead bundle on the tire building drum but that the bead wrap must first be placed on the building drum, then the bead bundle, then the body ply and then the free end of the bead wrap turned up to engulf the bead bundle and the body ply end. This prior art construction obviously does not eliminate the need for the expensive turn up operation in the tire building operation as does the present invention.

It is an object of this invention to provide a bead construction for a radial ply tire which is economic to manufacture, strong and performs satisfactorily.

SUMMARY OF THE INVENTION

The present invention eliminates the necessity of turning up or down (wrapping) the end of a ply of inextensible material, whether the ply be a body ply or a bead reinforcing ply, when the tire is being assembled on the tire building drum. The elimination of this step results in a significant simplification of tire construction, tire building machines and an ultimate, overall cost savings. The construction of this invention has a radial body ply which is not wrapped around the bead bundle and a radial bead connector ply which is wrapped around the bead bundle. These two plies, which both must have inextensible reinforcing cords, overlap to give a construction that has the effect of the body ply being wrapped around the bead bundle.

The construction has four basic features; (1) the cords of the body ply and bead connector ply must have an inextensible nature, (2) the cords of the body ply and the bead connector ply must be radial, (3) the end of the body ply is located on the same side of the bead bundle as the ply itself and (4) the end of the body ply is located either axially inside or outside of the bead connector.

In the construction described above, the bead bundle is provided with a bead connector ply which is wrapped around the bead bundle with its ends in the lower sidewall area of the tire an unequal distance from the bead bundle. The cords in the bead connector ply all extend radially of the tire and are of an inextensible material. Likewise, the cords in the body ply are all of an inextensible material and all are radial. Therefore, when the tire is cured, the cords of the body ply can be considered to nest with the cords of the bead connector. Due to the radial direction and inextensible nature of the cords of both plies, this construction has the strength and acts like one in which a body ply is wrapped around the bead bundle. This construction also has the same resistance to forces as a radial body ply that is wrapped around the bead bundle. This results in a strong construction which can be economically manufactured. It is understood that there must be a sufficient amount of overlap of the contiguous portions of these plies to give adequate nesting of the cords. This distance should be between 20 and 50 percent of the distance between the bead bundle and the edge of the tread belt plies. This distance is measured along the body ply periphery from the center of the bead bundle to the point on the body ply radially under the edge of the tread ply.

The body ply in the tire of this invention may be located either axially inwardly of the bead connector ply and bead bundle or axially outwardly. The building of the tire of this invention is simple compared to the prior art tires it replaces. In its manufacture, the bead connector ply is wrapped around the bead bundle to form a single, preconstructed unit, the bead unit. In the embodiment of this invention where the body ply is located axially outwardly of the bead bundle, a bead unit is placed at both edges of the tire building drum (an open-ended cylinder). The body ply is wrapped around the cylinder with its ends merely being stitched by the standard tread stitches to the bead unit. It is not necessary to make any ply turn ups. The tread ply belt, tread and sidewalls are then applied in the normal manner and the tire is later vulcanized. The only difference in the embodiment of this invention where the body ply is located axially inwardly of the bead unit is that the body ply is applied to the drum prior to the bead units.

This type of construction is applicable to conventional type tubed or tubeless truck tires, for example 10.00–20 or 11–22.5. It is applicable to similar off-the-road tires, the cantilever type tires of all types and to passenger car tires. The drawings which follow are diagrammatic, rather than true contours.

DETAILED DESCRIPTION OF THE INVENTION

Figure 1:
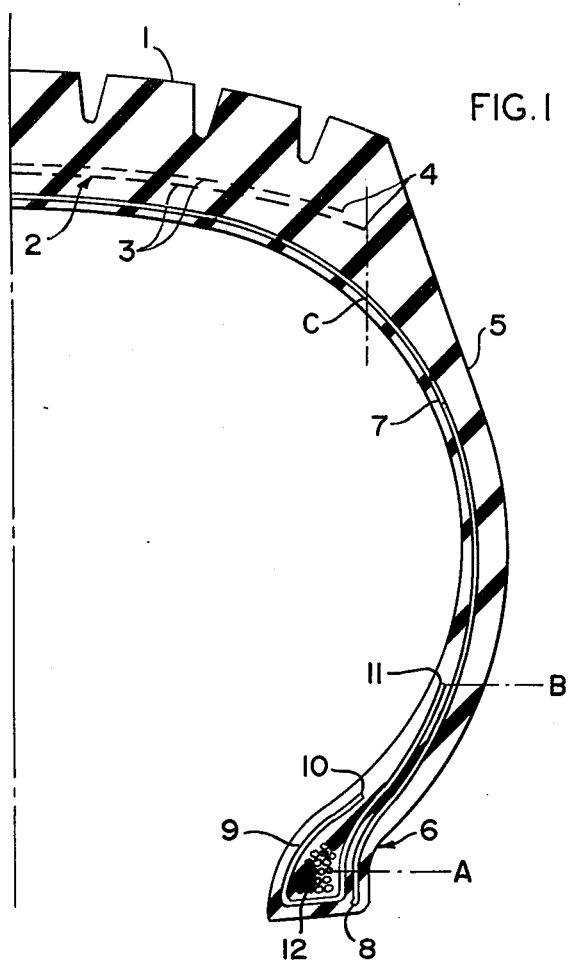
FIG. 1 is a partial cross-sectional view of a pneumatic tire disclosing one embodiment of this invention.

FIG. 1 shows a partial cross-sectional view of a pneumatic tire in which the tire is divided at its circumferential mid-point. In FIG. 1 the road-engaging tread surface, 1, contains a circumferential tread ply belt, 2, which is shown as containing two plies, 3, of tire cord fabric. The ends of these plies are identified as 4. This tread ply belt may be any of the known constructions. The road-engaging tread surface is connected to the bead area, 6, by sidewall, 5. FIG. 1 shows the sidewall containing one body ply, 7, the cords of which run radially of the tire; that is, perpendicular to the circumferential plane of the tire. These cords contain an inextensible material, such as steel wire, Kevlar or glass cords. The annular bead bundle, 12, may be any of the known bead bundle constructions. The bead connector ply, 9, is wrapped around the bead bundle with its ends, 10 and 11, located in the lower sidewall area of the tire at different radial distances from the bead bundle, 12. The end of the body ply, 8, is located axially outwardly of the bead bundle and bead connector ply on the same side of the bead bundle and bead connector ply as the body ply itself.

The length of the body ply and the bead connecting ply where they are contiguous to one another is at least 20% and not greater than 50% of the peripheral distance of the body ply measured from the mid-point of bead bundle, 12, along the body ply to the point on the body ply where the edges of the tread ply are located. In FIG. 1 this is represented by the distance from Point A, the mid-point of the bead bundle, to Point B, the end of the portion of the bead connector ply contiguous with the body ply, as compared to the distance between A and Point C, the point on the periphery of the body ply which is radially below the outside edge of the tread ply belt.

As with the body ply, the bead connector ply contains radially extending inextensible reinforcing cords, such as glass cords, steel wire or Kevlar. As a result of this identical disposition of the cords in the bead connector ply and body ply, the cords in the plies effectively contact cords in the contiguous plies to form a strong construction. The effect of this effective contracting is to give a construction which has strength and resistance to forces comparable to a construction wherein the body ply ends are wrapped around the bead bundles. It is envisioned that the bead connector ply, due to this effective contracting feature, merely acts as an extension of the body ply. It is, therefore, possible with the construction of this invention to obtain the strength of a construction wherein the body ply is wrapped around the bead bundle without the necessity of actually wrapping the body ply around the bead bundle.

Figure 2:
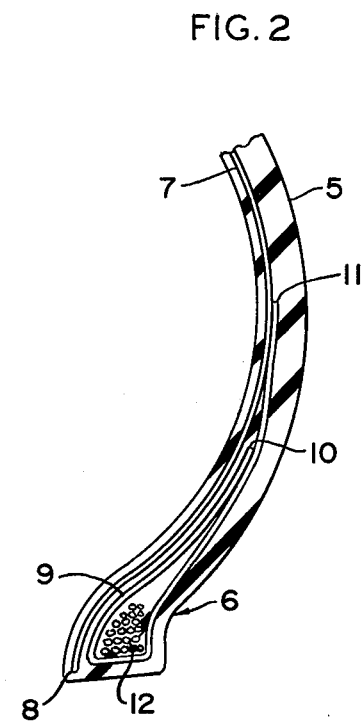
FIGS. 2, 3, 4 and 5 are partial cross-sectional views of the bead area of a pneumatic tire disclosing other embodiments of this invention.

FIG. 2 is a partial cross-sectional view of the bead area of a pneumatic tire showing another embodiment of this invention. All of the references in FIG. 1 apply to FIG. 2. The embodiment in FIG. 2 shows the body ply located entirely axially inwardly of the bead bundle and the bead connector ply.

Figure 3:
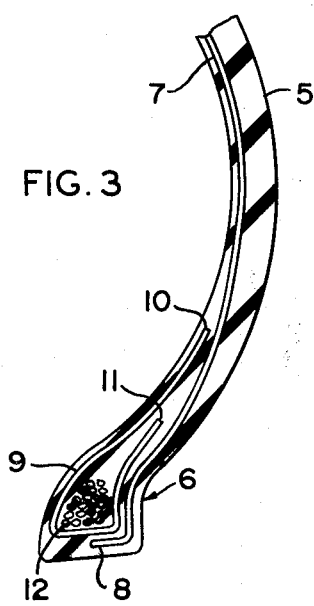

FIG. 3 is a partial cross-sectional view of the bead area of a pneumatic tire showing yet another embodiment of this invention. In this embodiment, as in FIG. 1, the body ply is located axially outwardly of the bead bundle and bead connecting ply. This embodiment differs from FIG. 1 in that the axially inner end of the bead connector ply, 10, is located radially farther from the bead bundle than the axially outer end, 11, of the bead connector ply. It is envisioned that a similar reversal in the location of the ends of the bead connector ply may occur in the embodiment shown in FIG. 2, that is, the axially inner end, 10, may be located radially farther from the bead bundle than the axially outer end, 11. In embodiments of this type, it is still necessary for the contiguous portions of the bead connector to be the required length; that is, 20 to 50 percent of the specified length of the body ply.

It is also envisioned that the body ply end could be located directly under the bead bundle where the stiffness of the body ply cord material permits such a location. FIG. 3 shows this embodiment wherein the end of the body ply, 8, is located radially under the bead bundle. This is accomplished merely by use of the standard tread stitches in the building process. The ply end does not engulf the bead bundle.

Figure 4:
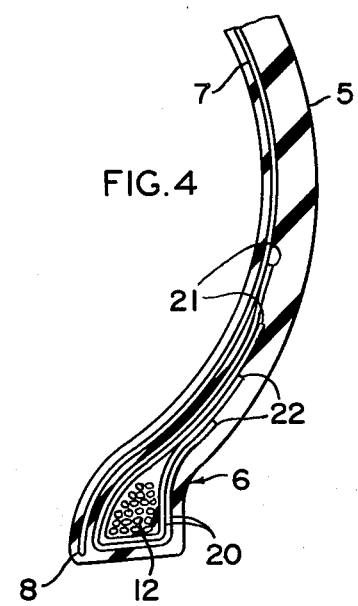

FIG. 4 is a partial cross-sectional view of the bead area of a tire showing yet another embodiment of this invention. In FIG. 4 the body ply, 7, has its end, 8, located axially inwardly of the bead bundle and bead reinforcing plies. In this embodiment the bead connector is formed of two plies, 20, instead of one. In this embodiment the axially inner ends, 21, of the bead connector plies are located a greater radial distance from the bead bundle than the axial outer ends, 22. It is understood that these radial distances may be reversed.

Figure 5:
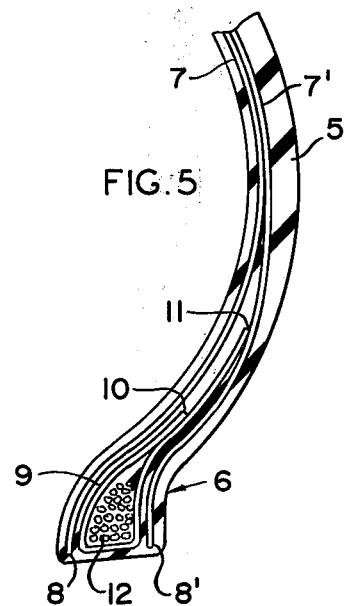

FIG. 5 is a partial cross-sectional view of the bead area of a tire showing yet another embodiment of this invention. In this embodiment two body plies, 7 and 7' are shown with their ends, 8 and 8', selectively located axially inwardly and axially outwardly of bead bundle, 12, and bead connector ply, 9. In this construction the contiguous length of both sides of the bead connector ply shown ending at 10 and 11, respectively, is 20 to 50 percent of the specific length of the body plies, 7 and 7', respectively. It is understood that both body plies in this embodiment may also selectively end on the same side of the bead bundle and bead connector ply, either axially inwardly or outwardly thereof.

It is contemplated that the inextensible reinforcing cords in the bead connector ply or plies may be made of a different inextensible material than the inextensible cords of the body ply. It is preferable that the cords of the bead connector ply and the body ply be made of materials having the same inextensibility, the same tensile and modulus. Also, different types and constructions of the same material may be used in these plies. For example, the body ply may be constructed of heavy, stiff cords of steel wire, whereas the connector ply may be constructed of lighter and more flexible cords of steel wire.

It is also contemplated that a tire may contain two embodiments of this invention; that is, the left hand bead area may have the body ply end located axially outwardly of its bead bundle and bead connector ply whereas the right hand bead area may have the body ply end located axially inwardly of its bead bundle and bead connector ply. Any such combination of the embodiments of this invention within one tire is permissible.

The Applicants have successfully tested a radial ply tubeless truck tire having the construction set out in FIG. 1. The tire tested was an 11–22.5 size. The single body ply contained radial cords of steel wire having a cable construction which is known in the industry as 1×4+6×4×.175+1×.15 and having 14 cords per inch. The bead connector ply contained radial cords of steel wire having a cable construction known to the industry as 1×4+6×4×.175+1×.15 and had 14 cords per inch. This tire performed satisfactorily under test conditions of high overload on a test designed by the Applicants to induce failures in the bead area of the tire.

This invention permits the elimination of some of the cord reinforcing strips presently used in the bead area; however, it is understood that the principle of this invention is not lost by providing strips or pieces of other materials in the bead area of the tire. Such strips could be cover strips around the ends of the bead connector plies or the body ply, chafer strips to resist the abrasion of the tire on the rim or reinforcing plies in the bead area of the tire to supply more strength and resistance to flexibility in this area, giving the tire greater lateral stability.

We claim:

1. A radial ply pneumatic tire having an annular road-engaging tread surface reinforced with a tread ply belt, sidewalls extending from the sides of said tread surface and terminating in annular bead bundles, said tire having at least one body ply of radially extending, parallel, inextensible, reinforcing cords extending from one said bead bundle to the other, each said bead bundle having at least one bead connector ply wrapped around it, said bead connector ply having radially extending, parallel, inextensible, reinforcing cords with its ends in the lower sidewall area of said tire, the ends of said body ply terminating near said bead bundles in the bead areas on the same axial side of both ends of said bead connector ply and on the same axial side as said body ply, each said end of said body ply being continuous with only one bead connector ply, said bead connector ply and said body ply being contiguous for a sufficient radial distance so that the inextensible cords of said bead connector ply and said body ply effectively contact one another to equally distribute the shear over said contiguous length to give the tire a strong construction without said body ply ends being wrapped around said bead bundles and said bead connector ply.

2. The tire of claim 1 wherein said contiguous length of said bead connector ply and said body ply is between 20 and 50 percent of the peripheral length of said body ply measured from the mid-point of said bead bundle to the point on said body ply axially under the edge of said tread belt.

3. The tire of claim 1 wherein said body ply is located axially inwardly of said bead connector ply.

4. The tire of claim 1 wherein said body ply is located axially outwardly of said bead connector ply.

5. The tire of claim 1 having at least two body plies in which at least one of the ends of one of said body plies is located axially inwardly of said bead connector ply and at least one end of another of said body plies is located axially outwardly of said bead connector ply in the same bead area.

6. The tire of claim 1 having at least two body plies in which all of the ends of said body plies are located axially inwardly of said bead connector ply.

7. The tire of claim 1 containing at least two said bead connector plies wrapped around each said bead bundle.

8. The tire of claim 1 wherein said inextensible cords in said bead connector ply and said body ply are both of the same inextensible material.

9. The tire of claim 1 wherein said inextensible cords in said bead connector ply are different than the inextensible cords in said body ply.

10. The tire of claim 1 having at least two body plies in which all of the ends of said body plies are located axially outwardly of said bead connector ply.

* * * * *

UNITED STATES PATENT OFFICE
CERTIFICATE OF CORRECTION

Patent No. 3,946,785     Dated March 30, 1976

Inventor(s) Robert Pope Powers & James Dennis Gardner

It is certified that error appears in the above-identified patent and that said Letters Patent are hereby corrected as shown below:

In Claim 1 at column 6, line 9, change the word "continuous" to "contiguous"

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*